United States Patent [19]

Sieradzki et al.

[11] 4,036,477
[45] July 19, 1977

[54] MIXER

[75] Inventors: Benjamin Sieradzki, Berkeley; John David Giese, Kensington, both of Calif.

[73] Assignee: Chemetron Corporation, Chicago, Ill.

[21] Appl. No.: 683,848

[22] Filed: May 6, 1976

[51] Int. Cl.² .............................................. B01F 7/00
[52] U.S. Cl. ......................................... 259/41; 259/6; 259/104
[58] Field of Search ..................... 259/21, 40, 41, 5, 6, 259/104, DIG. 11

[56] References Cited

U.S. PATENT DOCUMENTS

| | | | |
|---|---|---|---|
| 2,231,911 | 2/1941 | Hitt | 259/104 |
| 3,126,197 | 3/1964 | Maurer | 259/104 X |
| 3,565,403 | 2/1971 | Matsuoka | 259/104 |
| 3,873,070 | 3/1975 | Beken | 259/6 |

Primary Examiner—Edward J. McCarthy
Attorney, Agent, or Firm—N. M. Esser

[57] ABSTRACT

An apparatus for mixing or blending, and discharging ground meat or the like. The apparatus includes a tub having a pair of spaced, agitator mounted, shafts which shafts are mounted therein for counter-rotation, with the agitators over-lapping, to mix and continuously circulate the meat and also to rapidly discharge same through a movable door when desired. Agitators are fixedly and specifically positioned on the shafts to achieve the desired objectives depending only upon the position of the discharge door for each function.

8 Claims, 5 Drawing Figures

MIXER

BACKGROUND OF THE INVENTION

1. Field of the Invention

This invention pertains to mixers for food products.

2. Description of the Prior Art

A conventional mixer may have a varying tub size that will handle 750 lbs. to 10,000 lbs. of preferably ground meat. The mixer is normally filled from above with the product by means of a conveyor or similar equipment. Inasmuch as a definite period of time may be required for complete mixing, two counter-rotating shafts having agitators thereon may be utilized. The shafts may have similar pitch paddles located thereon which will also cause the product to move longitudinally in the tub driven by the paddles of one shaft and returned by the other, thus continuously recirculating same. Frequently the paddles overlap for better mixing between the shafts. Normally a drive for the counter-rotating paddles is located at one end of the tub and movable discharge doors at the other end. Also associated with mixers of this type may be top covers for vacuumizing the food or $CO_2$ or steam injection. The discharge doors may be operated manually or remotely by suitable actuating means. Of course, easy cleanup must be possible with these batch type mixers.

For good mixing and economy of construction it is customary to make each shaft and its agitators, which may be paddles or ribbons or combinations thereof, the same and rely on the counter-rotating shafts to secure the internal circulation. Also, if paddles, they are usually mounted on spokes attached to each shaft along a right hand helix with each mixing paddle having a left hand pitch at about 45° to the centerline of the shaft. Due to a preferable over-lap between the paddles of each shaft, a very good mixing action is obtained. Suitable paddle arrangements at each end of the tub aid in internal circulation. To discharge the product, usually the end opposite the drive is movable for the shafts and agitators to discharge the product. Some tubs tilt 90° to discharge but usually further cleaning is needed. Also bottom discharges have been used but without much success. While the above described devices have mixed the product fairly well, the discharge time has been unduly lengthy resulting in substantial "down time" of the mixer.

SUMMARY OF THE INVENTION

Applicants have designed a mixer that retains the efficient mixing of the prior art while greatly reducing discharge time without the need of rearranging the components prior to discharge. Merely by opening the discharge end of the mixer, the modified discharge and mixing means adjacent thereto, quickly discharge the product reducing the time required to one quarter of the original time. Careful analysis of test data during the experimentation with various type agitators and their effect on the ensuing flow patterns and efficient design produced improved discharge performance without sacrifice in mixing capability, which is considered new, surprising and unexpected due the very complicated flow patterns possible from the large number of possibilities available.

It is, therefore, an object of this invention to provide a new and improved mixer.

Another object of this invention is to provide a mixer that mixes effectively and discharges at high speed.

Another object of this invention is to provide a mixer that mixes effectively and discharges at high speed without changing the agitators for each operation.

DESCRIPTION OF THE PREFERRED EMBODIMENT

Figure 1:
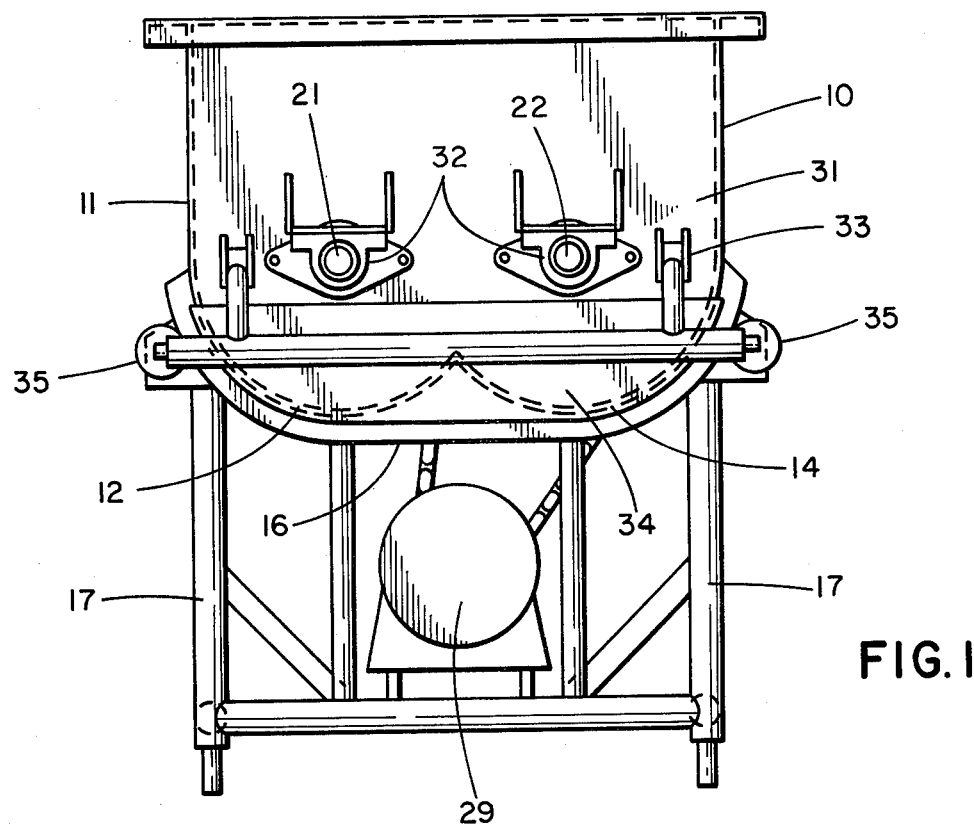
FIG. 1 is a front elevation of the mixer of this invention.

Referring to FIGS. 1, 2 and 3, 10 indicates the mixer of this invention. Mixer 10 includes a longitudinally extending tub-like element 11 with an open top adapted to be closed by a cover when desired — especially during vacuum use or $CO_2$ or steam injection. Tub 11 has spaced, partially cylindrical bottom sections 12 and 14 to accommodate similarly curved agitators moving in close relationship thereto. Suitable reinforcement 15 is provided at the longitudinal mid-point of tub 11 for bottom sections 12 and 14. Similar reinforcement 16 is provided at one end and somewhat comparable reinforcements may be provided at the other. Legs 17, which may be adjustable and with four shown, and legs 18 with supporting members support the mixer at a desirable height.

Figure 3:
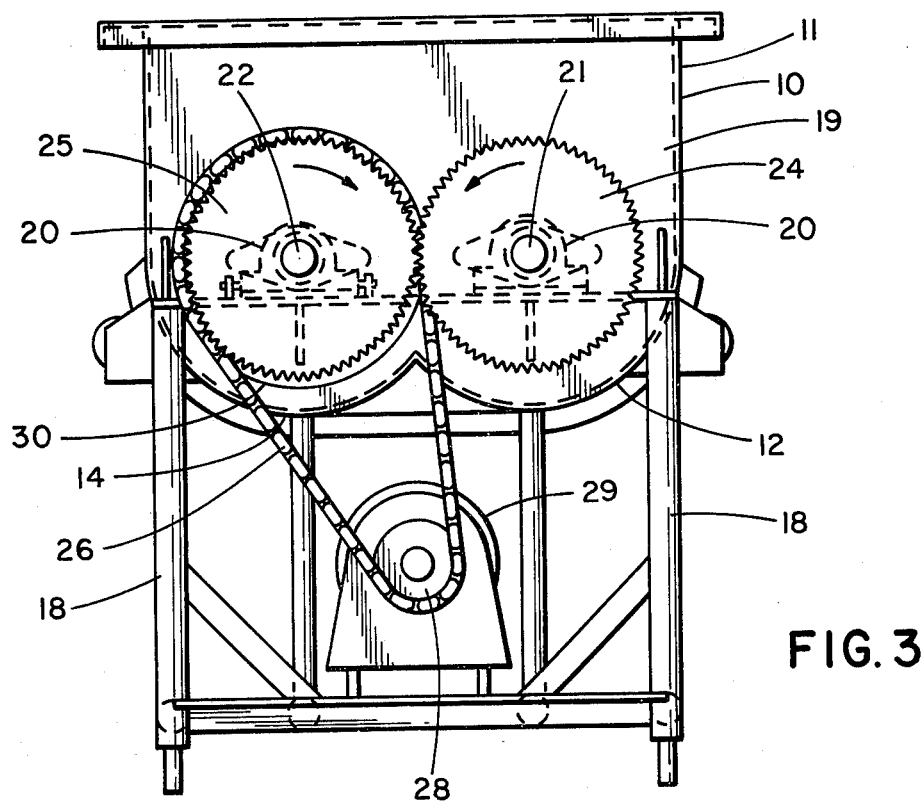
FIG. 3 is an end view of the mixer.
Figure 2:
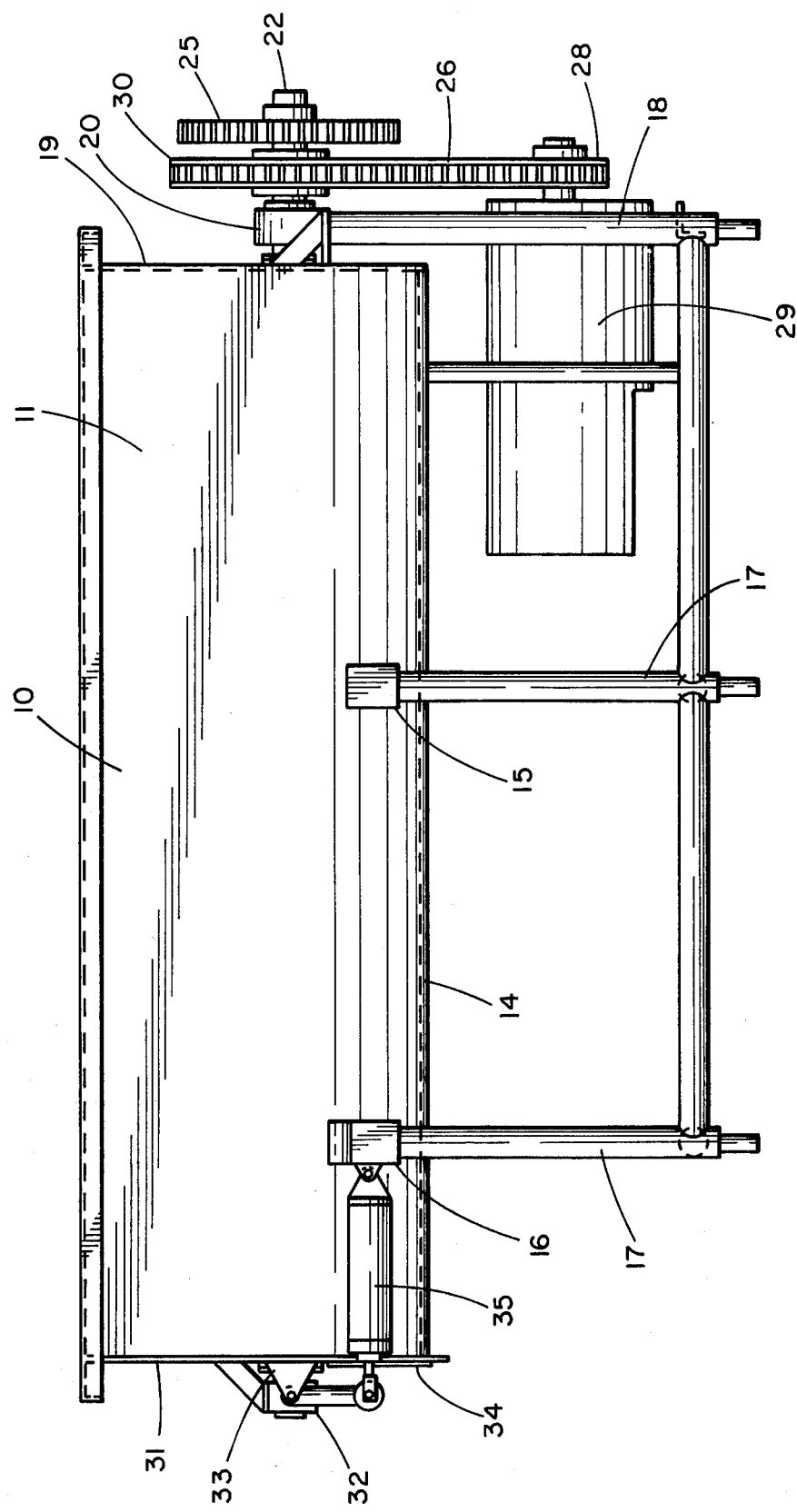
FIG. 2 is a side view of the mixer.

Tub 11 has a rear drive end 19 which is fixed to the tub and reinforced for rear bearings 20 located at the exterior thereof. Each bearing 20 is located at the center of rotation for the agitator shaft 21 at the center of rotation for section 12 and shaft 22 for section 14. Extending outwardly from mixer 10 at the rear bearing end are intermeshing spur gears 24 and 25 which are fixedly mounted on shafts 21 and 22. A chain 26 extending from drive sprocket 28 driven by electric motor 29, drives driven sprocket 30 and therefore gear 25 which then rotates gear 24. The direction of rotation of shafts 21 and 22 driven by the aforementioned gears is preferably counterclockwise for gear 24 and shaft 21 and clockwise for gear 25 and shaft 22 as shown in FIG. 3.

Front end 31 is located on the tub end opposite the drive end and has bearings 32 mounted thereon which support shafts 21 and 22 where same extend through the end and outside the tub. End 31 has a lower portion and hinged thereto by clevis 33 and extending the full width of the end is discharge member 34. Cylinders 35 located on each side of tub 11 are utilized to open member 34 for discharge and close same for mixing.

Shaft 21 is mounted in tub 11 by bearings 32 and 20 as is shaft 22. The shafts while largely similar are modified by the agitating means utilized. Clockwise rotating shaft 21 (See FIGS. 4 and 5) has a plurality of agitators or mixing paddles 35 having spokes mounted on a right hand helix at intervals of 120°. The pitch of the individual paddles is LH and at about 45° to the longitudinal axis of the shaft when viewing same from the discharge end. As shown on the drawing, eight mixing paddles are shown. At the drive end, mixer and a scraper paddle 36 also has a left hand pitch. From a view of the arrows showing the product flow, paddles 35 and 36 aid in directing the food toward the paddles on shaft 22 for the mixing and circulation in the tub. At the discharge end of shaft 21, the mixer paddle 38, has a similar spoke mounting as paddles 35, but is preferably of a right hand pitch of about 45°. Further, the adjacent mixer scraper paddle 39 has a right hand pitch also but the spoke therefor is set in a 120° LH spiral pattern with respect to the spokes for paddles 35 primarily to avoid collision with the adjacent agitating means on the adjacent shaft. Scraper 39 aids in recirculation when the discharge end is closed.

Regarding the right hand shaft 22, eight agitators or mixing paddles 40 are mounted thereon on a right hand helix at 120° intervals and with left hand pitch at 45° to the axis of the shaft. Hence shaft 22 is similar to shaft 21 but the rotation of the shaft is reversed producing a different flow. Scraper and mixing paddle 41 has a left hand pitch and is utilized to aid flow much like similar paddle 36. Adjacent the discharge end, ribbon 42 (which has support spoke 42a) having a left hand pitch supplants earlier paddles. Ribbons produce axial flow with less mixing. Also mounted a shaft 22 by support 43 is scraper 44 for contact with the discharge end which aids in recirculation when the discharge end is closed.

Arrows in solid lines indicate the flow during mixing and recirculation. Arrows in broken lines indicate the flow during discharge and only at the discharge end with the arrows in solid lines indicating flow in the balance of the mixer. Applicants, due to the thorough mixing, only are theorizing as to the true flow which produces the fast discharge with efficient mixing. Seemingly the flow patterns are plausible representations of true flow as test results appear to substantiate the theory. Of course, many possibilities were considered in testing and due to the large number of possible variables, the results obtained cannot always be positively attributed to the exact structure utilized. Essentially, Applicants feel that by making the flow axial with less mixing adjacent to the discharge, discharge will be improved with same in the open position. Of course, in the closed position, the structure must aid in recirculation and mixing.

Figure 5:
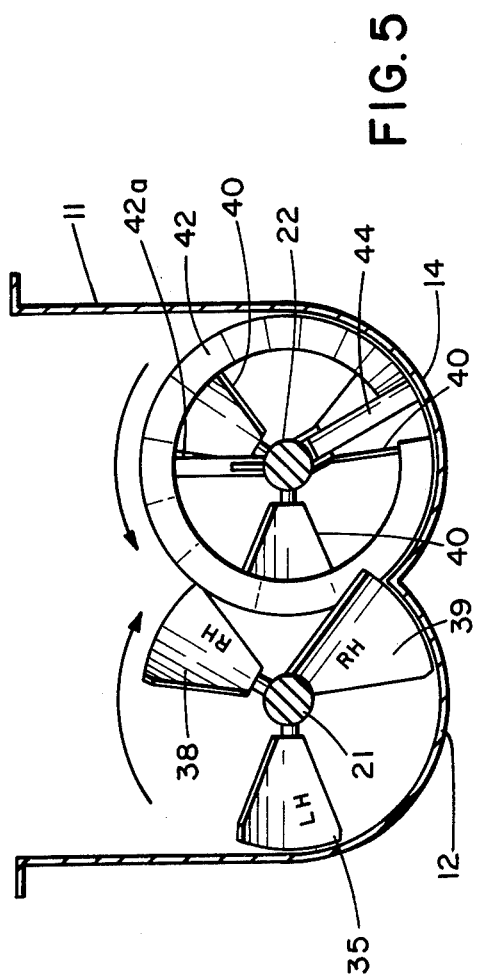
FIG. 5 is an elevational section taken along 5—5 of FIG. 4 showing the shafts and associated agitators with the preferred shaft rotation shown by arrows.

In operation, the meat product is preferably loaded into the mixer by a conveyor with the tub discharge portion closed. Upon actuation of motor 29, connected drive sprocket 28 will rotate chain 26 and hence drive sprocket 30 fixedly mounted on shaft 22. Gear 25 also mounted on shaft 22 is thus driven and in turn drives gear 24 and thus shaft 21 in a contrary direction as shown by the arrows of FIG. 5. Mixing, of course, may be accomplished in contrary rotational directions.

Figure 4:
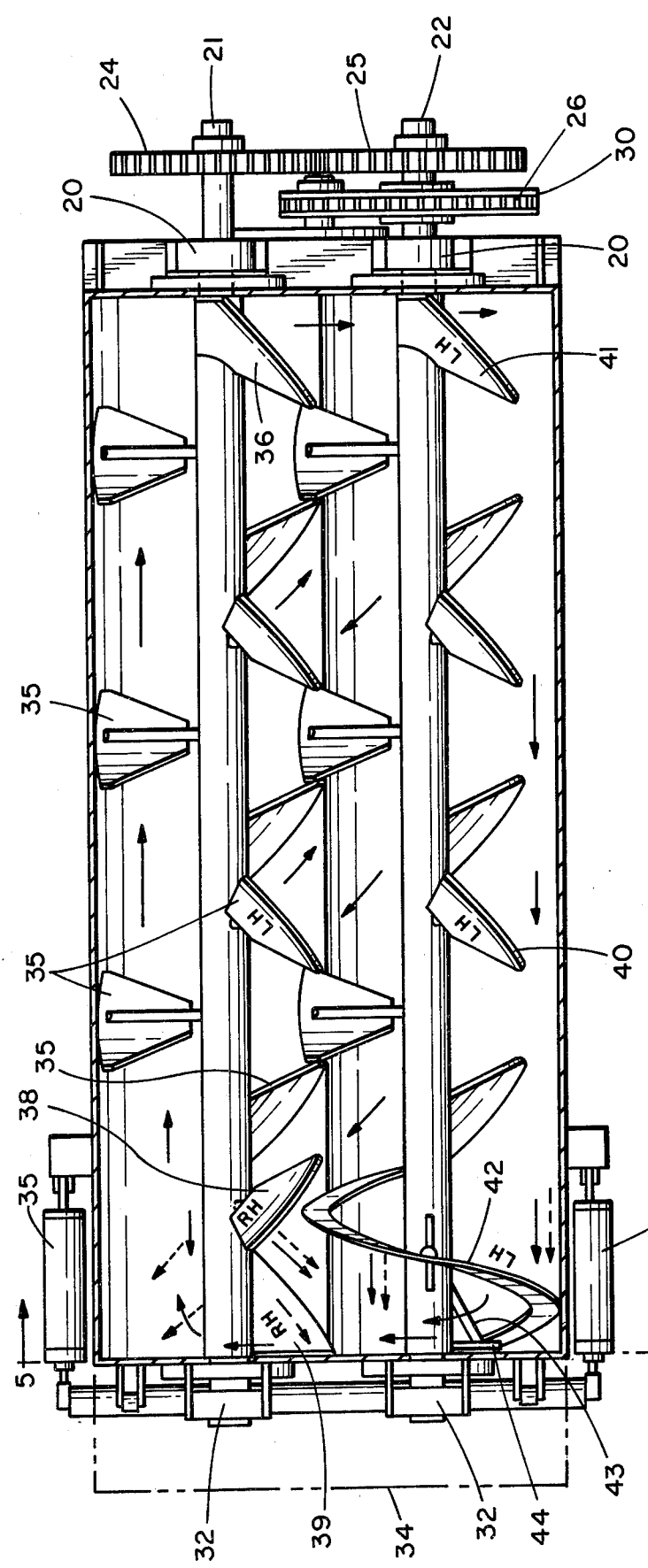
FIG. 4 is a plan view of the mixer with portions cut away and with the shafts and associated agitators mounted thereon and with the arrows showing the flow patterns during mixing and discharge.

As shown by the arrows noted in solid lines in FIG. 4, flow during mixing follows a continuous path in a clockwise manner through the mixer. Due to the opposite rotation of the shafts, the flow generally is from the discharge end toward the drive end along shaft 21 and then transversely to shaft 22 and then back toward the discharge end along shaft 22. At the discharge end the flow is directed transversely back to shaft 21 for recirculation. Due primarily to the mixing paddle pitches, a component of flow is directed toward each shaft to promote thorough mixing. Paddles 36 and 41 with their scraper portions help to move the product in a transverse direction at the drive end of the mixer and scraper 44 and scraper mixer paddle 39 perform a similar function at the discharge end. Due primarily to the pitch of mixing paddles 35, the flow along shaft 21 is apparently directed at an angle of about 45° about the periphery of the shaft. The portion of the flow about shaft 21 that is adjacent shaft 22 is directed in that direction, while the portion adjacent the closely mounted tub is deflected generally longitudinally along the shaft 21.

A similar type flow along shaft 22 is developed by the mixing paddles thereon noted by the solid line arrows, with the greatest mixing apparently occurring where the flows collide between the overlapping paddles.

When discharge is desired, movable 34 discharge member which extends the full width of the mixer is caused to open by actuation of the associated cylinders. In this situation, less mixing is desired at the discharge end between the shafts, hence the pitch of paddles 38 and 39 which is right hand instead of left hand causes a flow toward the discharge as shown in broken arrows instead of toward the drive end as provided by paddles 35. This flow is apparently normally overcome by the scraper action of wide mixer scraper paddle 39 when the discharge member is closed which is aided by the adjacent mixer paddles on shaft 22. Ribbon 42 on shaft 22 also provides a generally longitudinal flow at the discharge end of this shaft so the discharge components of paddle 38 are not counter balanced. Ribbon scraper 44 is essentially a very narrow paddle and is not effective in blocking flow in the discharge open position. A suitable right hand ribbon could be used on shaft 21 adjacent the discharge in lieu of the right hand pitch paddles since there would be no collision between the ribbons because of their opposite pitch even with a substantial overlap.

By experimenting with the agitators as noted, which was necessary due to the varied flow patterns, Applicants satisfactorily mixed a meat product in two minutes and discharged it in two minutes rather than mixing in two minutes and discharging in eight minutes as in the past and with unchanged agitators at the discharge end of the mixer.

We claim:

1. A mixer for mixing and discharging materials such as ground meat or the like, comprising:
   a. an elongated tub having a discharge end;
   b. means to selectively close said discharge end;
   c. a pair of shafts mounted for rotation in said tub, said shafts having a plurality of spaced mixing paddles having the same hand pitch mounted thereon in an overlapping arrangement between said shaft centers, each mixing paddle being adapted, upon shaft rotation, to approach a complementary curved surface of said tub to clean same;
   d. driving means connected to each shaft adjacent the end of said tub opposite the discharge end to drive one shaft in one direction and the other shaft in another;
   e. a first mixing means mounted on said one shaft adjacent said discharge end and having an opposite hand pitch than the plurality of mixing paddles thereon; and
   f. a second mixing means mounted on said other shaft adjacent said discharge end and having the same hand pitch as the mixing paddles thereon, whereby upon rotation of said one shaft, said first mixing means causing flow toward said discharge end and said mixing paddles causing flow toward the tub drive end and also toward said other shaft, and upon counter rotation of said other shaft, said mixing paddles thereon causing flow toward said discharge end and also toward said one shaft and said second mixing means causing flow toward said discharge end, for efficient mixing and discharge action upon opening said discharge end.

2. The mixer of claim 1 further comprising a scraper paddle mounted on each shaft adjacent the drive end of said tub, each of said scraper paddles having the same hand pitch as said plurality of mixing paddles.

3. The mixer of claim 2 in which said second mixing means mounted on said other shaft is a ribbon and a scraper, said scraper being attached to said ribbon and located adjacent said discharge end.

4. The mixer of claim 3 in which said first mixing means comprises a mixing paddle and a mixing scraper paddle, said mixing scraper paddle being located adjacent said discharge end.

5. The mixer of claim 4 in which all of said mixing paddles and drive end scraper paddles are mounted on each shaft by spokes located on a helix having the same pitch.

6. The mixer of claim 5 in which the spacing of each mixing and drive end scraper paddle of said helix is approximately 120°.

7. The mixer of claim 6 in which all mixing and drive end scraper paddle pitches are at approximately 45° from the center of the shaft.

8. The mixer of claim 7 in which said mixing scraper paddle adjacent said discharge end is set on said one shaft on a helix counter to the helix of the adjacent mixing paddle.

* * * * *